United States Patent [19]

Huffman

[11] Patent Number: 4,551,830
[45] Date of Patent: Nov. 5, 1985

[54] APPARATUS FOR PROVIDING LOOPBACK OF SIGNALS WHERE THE SIGNALS BEING LOOPED BACK HAVE AN OVERHEAD DATA FORMAT WHICH IS INCOMPATIBLE WITH A HIGH SPEED INTERMEDIATE CARRIER OVERHEAD FORMAT

[75] Inventor: Charles E. Huffman, Plano, Tex.

[73] Assignee: Rockwell International Corporation, El Segundo, Calif.

[21] Appl. No.: 591,083

[22] Filed: Mar. 19, 1984

[51] Int. Cl.⁴ .............................................. H04J 3/14
[52] U.S. Cl. ...................................... 370/15; 370/102
[58] Field of Search .......................... 370/15, 102, 13; 179/175.3 R; 375/10

[56] References Cited

U.S. PATENT DOCUMENTS 3,461,245  8/1969  Johannes et al. .................... 370/102
4,059,729  11/1977  Eddy et al. ............................ 370/15

Primary Examiner—Douglas W. Olms
Attorney, Agent, or Firm—Bruce C. Lutz; V. L. Sewell; H. Fredrick Hamann

[57] ABSTRACT

The overhead format for DS1C data must be removed and the data broken into two DS1 format data signals before being transmitted over DS2 or DS3 transmission lines. The present invention demonstrates a method whereby the stuff bit code for appropriate frames of a high speed transmission line can be violated and remotely detected whereby the signal is looped back at the destination end of the desired signal whether the remote signals are in the DS1C or DS1 data format.

4 Claims, 9 Drawing Figures

APPARATUS FOR PROVIDING LOOPBACK OF SIGNALS WHERE THE SIGNALS BEING LOOPED BACK HAVE AN OVERHEAD DATA FORMAT WHICH IS INCOMPATIBLE WITH A HIGH SPEED INTERMEDIATE CARRIER OVERHEAD FORMAT

THE INVENTION

The present invention is generally concerned with telecommunications and more specifically with a method of looping back signals transmitted over a transmission line to a destination and back for transmission medium testing purposes. Even more specifically, this invention is directed towards the situation where the signal to be looped back is a DS1C (3.152 megabyte per second) formatted signal since this signal, including overhead, cannot be directly transmitted on either a DS2 or DS3 transmission line. Rather, the overhead bits must be stripped off the DS1C signal and the data portion broken into two DS1 (1.544 megabit per second) transmission channels each comprising a subframe in a main frame of data in the DS2 (6.312 megabyte per second) line or the DS3 (44.736 megabyte per second) data transmission line data format.

BACKGROUND

Pulse stuffing, as a general concept, is well described in many prior art references, one example being a Johannes, et al., U.S. Pat. No. 3,461,245, assigned to Bell Telephone Laboratories.

In the prior art, the loopback of signals, for DS1 data format signals only, has been accomplished by the present inventor using a technique somewhat similar to the present. A stuff bit code was intentionally violated on a periodic basis for the DS1 transmission lines. Since the overhead data utilized for a DS1 transmission channel can be accepted without change by either a DS2 or DS3 high speed transmission line, the entire data channel was merely transmitted across the DS2 or DS3 transmission line. At the destination, the violation of the stuff code was detected and switches were set to provide loopback of the signal to the source. A stuff code detector used a voting circuit and relied on two out of three bits being correct and thus, the violation of the third bit did not normally affect correct transmission of stuffing data. The loopback connection was set only after a predetermined number of consecutive violations had been detected and was maintained only as long as these violations continued to be detected.

The concept, as described above, is not immediately applicable to the transmission of DS1C data since the overhead bits are stripped from the DS1C signals before the signal is divided into two DS1 signals. Thus, the present invention does not insert the violation of the stuff code until after all of the data is in the DS2 format wherein the DS1C signal comprises two subframes of a frame in the DS2 format. Since each subframe has its own set of overhead bits as defined in Technical Advisory No. 50 from American Telephone and Telegraph Company, the loopback detection and switching equipment at the destination end can set whatever number of switches is appropriate.

In view of the above, it is an object of the present invention to provide a solution to the problem of "looping back" signals from a remote destination where the signal being looped back does not retain its original overhead bits in the transmission medium.

Other objects and advantages of the present invention will be obvious from a reading of the specification and appended claims in conjunction with the drawings wherein:

DETAILED DESCRIPTION

Figure 1:
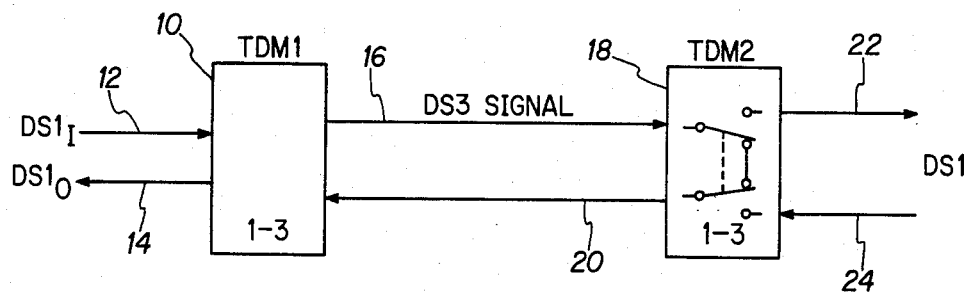
FIG. 1 is a block diagram of the closest known prior art as originated by the present applicant.

In FIG. 1 a local time division multiplex (TDM) unit 10 is shown receiving and transmitting DS1 signals on lines 12 and 14. The time division multiplex 10 transmits signals on a lead 16 in the DS3 format to a second and remote time division multiplex 18. It receives signals from multiplex unit 18 on a lead 20. Two DS1 leads 22 and 24 are connected to the time division multiplex unit 18 also. Both the units 10 and 18 are labeled 1-3 since they convert from DS1 format to DS3 format and vice versa. Unit 18 has a loopback switch shown which is not numbered and is controlled by means not shown.

Figure 2:
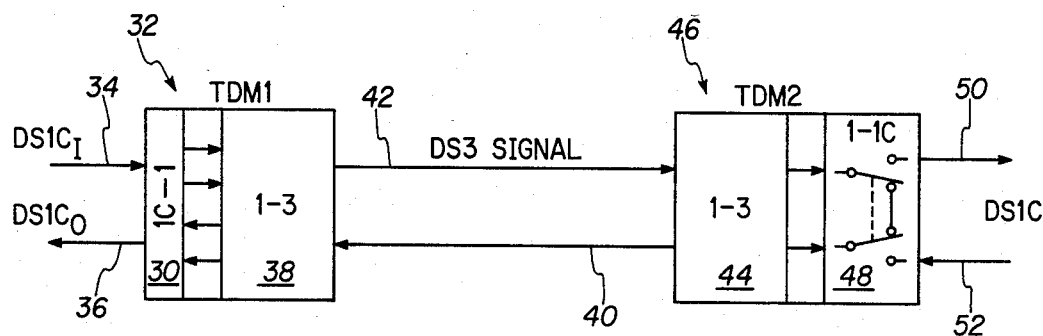
FIG. 2 is a block diagram of one embodiment of the present inventive concept where both the source incoming and destination outgoing signals are in the DS1C format.

In FIG. 2 DS1C signals are input to and output from a DS1 to DS1C portion 30 of a local time division multiplex block 32 on leads 34 and 36, respectively. Another portion of block 32 is labeled 38 and is a DS1 to DS3 converter. As illustrated, there are a set of leads between portions 30 and 38 of time division multiplex block 32. The signals between portions 30 and 38 are in the DS1 format. Signals are supplied on leads 40 and 42 in the DS3 format between a portion 44 of a remote time division multiplex block 46 where there is another conversion between DS3 format and DS1. Signals are transferred then in the DS1 format to a portion 48 of block 46 where they are converted to DS1C format for interchange via leads 50 and 52.

Figure 3:
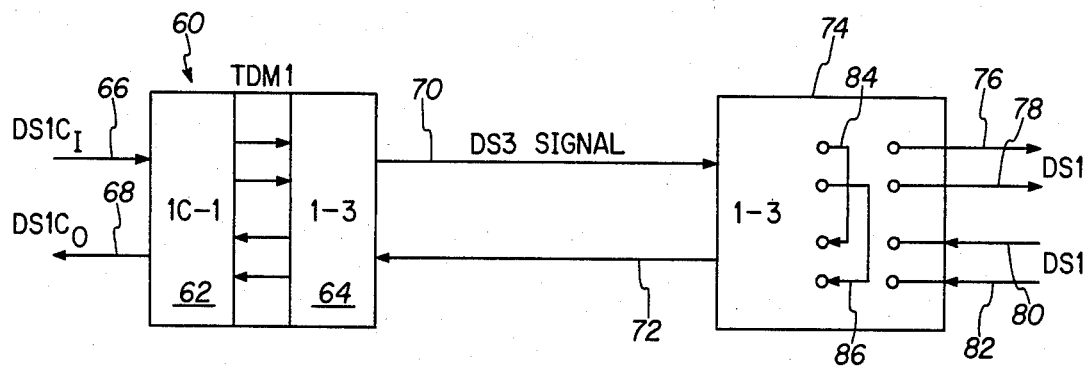
FIG. 3 is a block diagram of a situation where the source incoming signals are DS1C format while the destination outgoing signals are DS1 format.

FIG. 3 is similar to FIG. 2 for the lefthand portion in that there is a local main TDM 60 having portions 62 and 64 whereby the DS1C input signals are converted to DS3 with numbering as shown. The righthand remote block 74 is a DS3 to DS1 signal converter with DS1 leads 76, 78, 80 and 82. In addition, there are jumper circuits or loopback circuits including switches generally designated as 84 and 86 within block 74.

Figure 4:
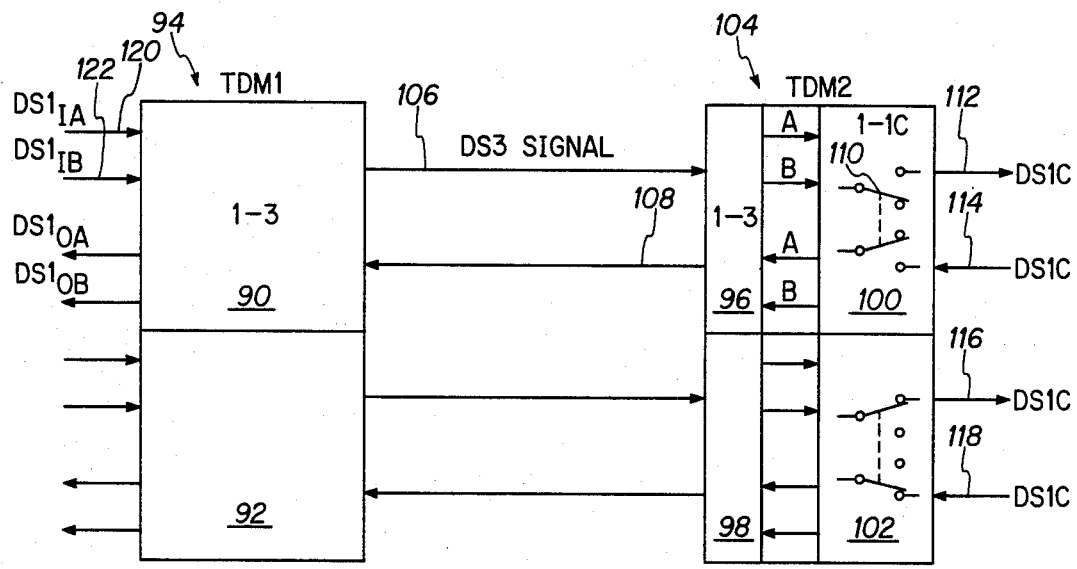
FIG. 4 is a block diagram where the source incoming signals are DS1 format and the destination outgoing signals are DS1C format.

FIG. 4 is basically the inverse of FIG. 3 in that the loopback is taking place in the DS1 to DS1C converter rather than in the DS3 to DS1 converter. In FIG. 4 additional time division multiplex sections are shown such as 90 and 92 within the overall local TDM block 94 and sections 96, 98, 100 and 102 within the remote time division multiplex unit 104. As further illustrated, a loopback circuit 110 is shown within the DS1 to DS1C converter 100 portion of time division multiplex unit 104 which prevents the signals from being transmitted on the leads 112 and 114 of TDM 104 during the loopback session.

Figure 5:
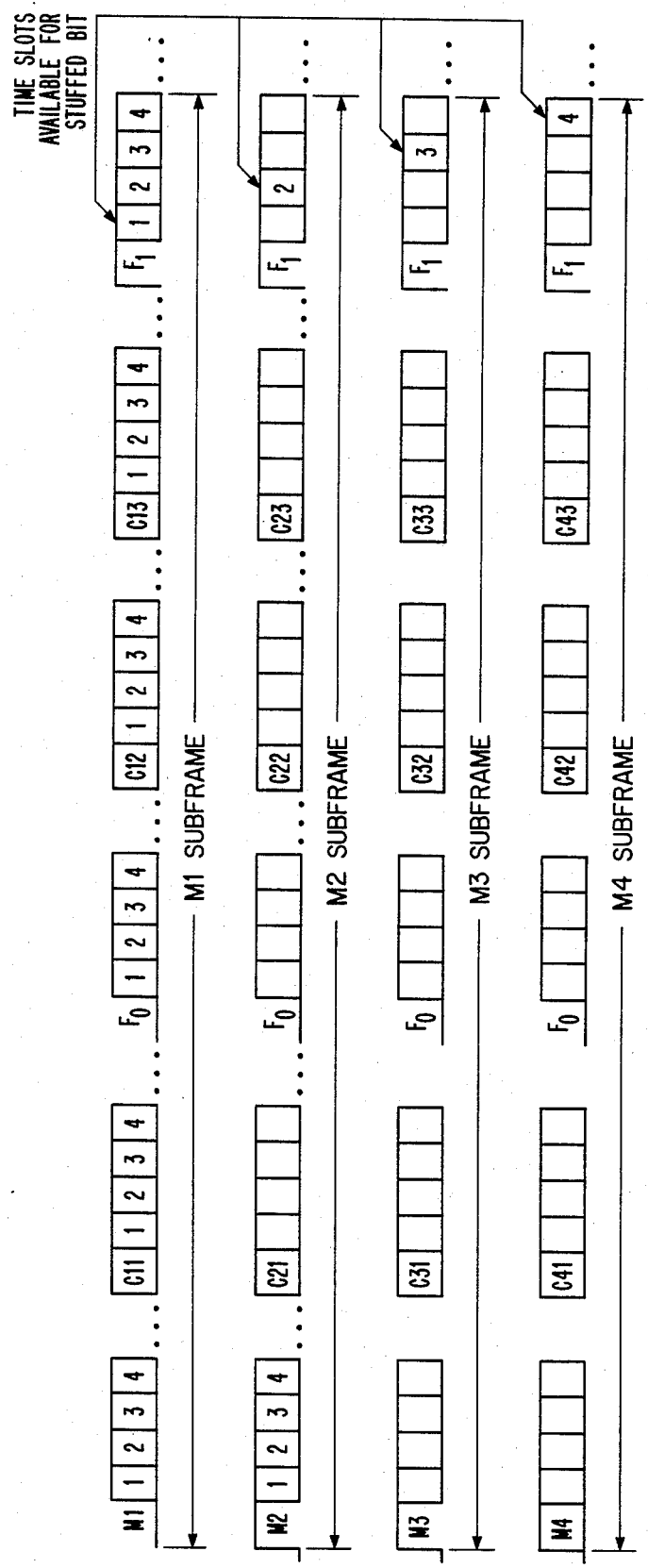
FIG. 5 is a chart illustrating the subframe control bit or overhead bit sequence as defined by American Telephone and Telegraph for a DS2 data stream.

In FIG. 5 a series of subframe overhead control bits are illustrated with the first four data bits of that subframe and several dots to illustrate that there are many more data bits in that subframe. The control bits labeled C such as C11, C12 and C13 in a given set of data such as shown for M1 subframe are the stuff code bits. As defined by American Telephone and Telegraph Company, the first bit following the F1 control bit is the time slot available for stuffing a bit into the data stream. In the next subframe M2, it is the second bit following the F1 bit that is available for stuffing. Likewise, on the M3 and M4 subframes it is respectively the third and fourth bit following the F1 bit that is available for stuffing. In each case it is the three corresponding "C" control bits prior to the F1 subframe that determines whether or not a bit is stuffed in the appropriate time slot. The total data rate for this data stream is 6.312 megabytes per second and each of the subframes M1 through M4 is able to contain a 1.544 megabit per second data stream equivalent to a DS1 data format. As is known to those skilled in the art, the M data bit positions are multiframe alignment signals while the F control bits are frame alignment signals. If at least two out of three of the stuff control bits C are logic zero as determined by a voting type logic value detector, the indication is that there is no stuffing and if at least two out of three are a logic 1, a determination is made by the circuit that a data bit has been stuffed in the appropriate position following the F1 control bit.

Figure 6:
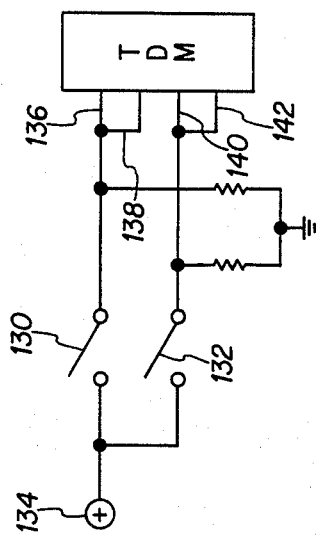
FIG. 6 illustrates the circuitry for requesting a loopback of a given signal.

In FIG. 6 a pair of switches 130 and 132 are shown between a positive power supply 134 and a plurality of output terminal leads going to a TDM block. Typically, the output leads labeled from 136 to 142 are kept at ground potential and when either or both of the switches are closed the appropriate leads are raised to a logic 1 potential.

Figure 7:
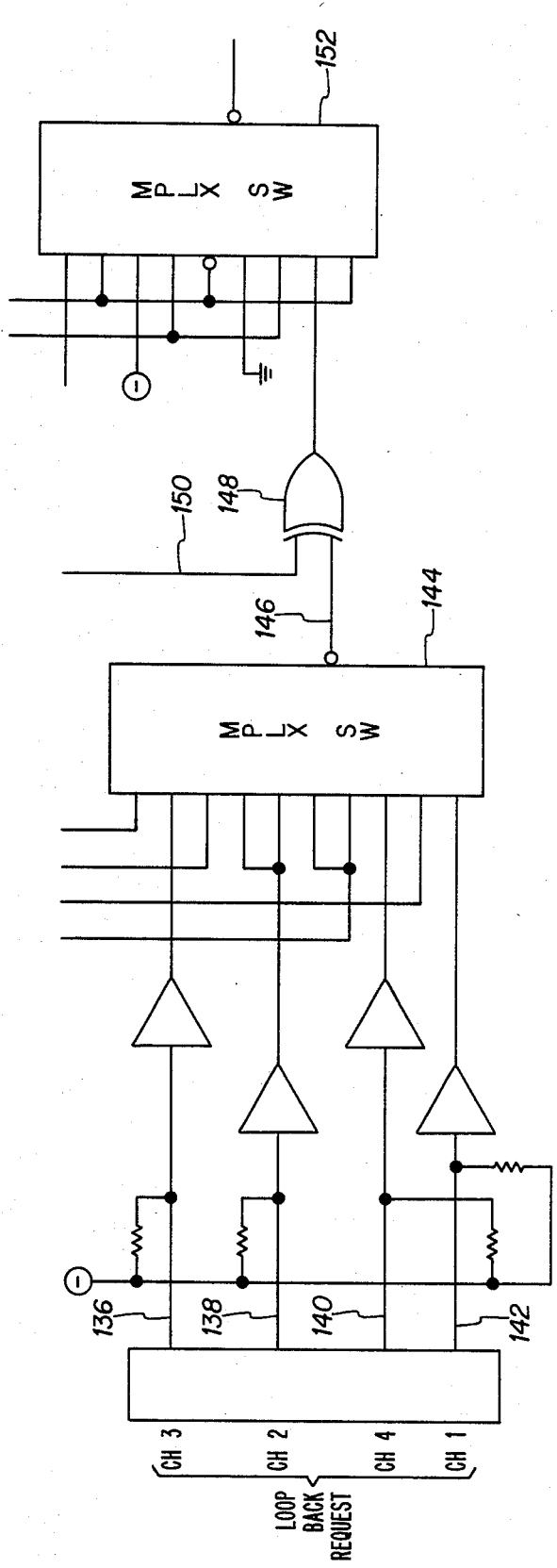
FIG. 7 illustrates the circuitry which receives the loopback request from FIG. 6 and generates a violation of the stuff bit code to the appropriate frame or subframes of the DS2 data stream.

In FIG. 7 the input leads correspond to 136 through 142 of FIG. 6 and also corresponding to channels 1-4 as shown and are input to a plurality of isolation buffers before being supplied to a 4-1 multiplexer switch 144. The output of multiplexer 144 is supplied on a lead 146 to an exclusive OR gate 148 which receives a further input on a lead 150. Lead 150 normally supplies the stuff bit signals received by a time division multiplexer switch 152 and when a signal appears on lead 146, it alters the logic value of the third control stuff bit. As used in this specification this alteration is called a "violation" of the stuff bit code. The output of block 152 is TDM combined in further circuitry with the data. This further circuitry of standard design is not necessary to an understanding of the inventive concept.

Figure 8:
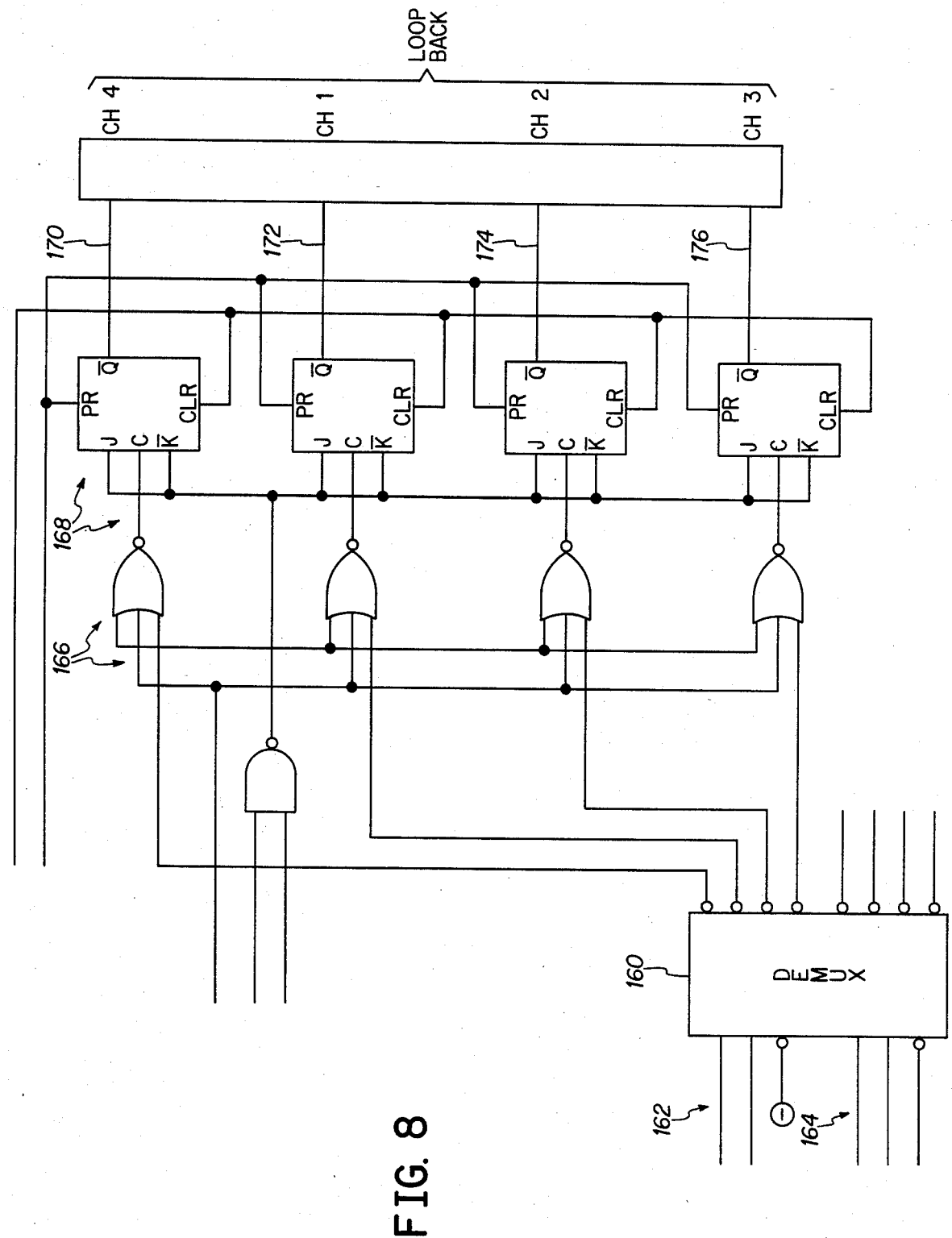
FIG. 8 is a decode and stuff bit violation detector at the destination end of the looped back signal.

FIG. 8 is a decode and stuff bit violation detector situated at the remote time division multiplex unit. A demultiplexer block 160 receives signals input in the DS2 format on two sets of leads 162 and 164 and demultiplexes these signals to four channels of information each. The circuitry comprising the NOR gates generally designated as 166 in combination with the flip-flops generally designated as 168 detect the value of each occurrence of the third stuff bit in a subframe and output the value of this third bit of each of the four subframes or data channels on the leads 170, 172, 174 and 176, respectively. In one embodiment of the invention, channels 1 and 2 were terminals 172 and 174 while channels 3 and 4 were lines 176 and 170, respectively.

Figure 9:
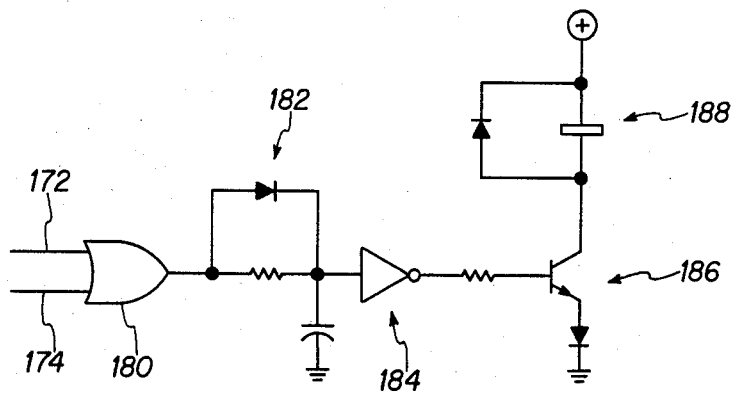
FIG. 9 is a decode circuit for decoding which of the lines should be looped back as well as an integrator and switch circuit for preventing the loopback condition until the violations have occurred for more than a predetermined amount of time.

FIG. 9 illustrates a circuit for decoding the loopback request and actuating a relay after integrating the request over a period of time. As illustrated, an OR gate 180 has two inputs labeled the same as channels 1 and 2 in FIG. 8. An output of the OR gate is passed through an integrating circuit generally designated as 182 to an inverter or isolating amplifier 184 which feeds a transistor generally designated as 186 configured for operating a relay 188.

Another circuit like FIG. 9 would be required for channels 3 and 4. The relay 188 would be designed to accomplish the loopback function of the circuit generally indicated within blocks 18, 48, 74 or 100 of the various FIGS. 1 to 4.

OPERATION

As previously indicated the purpose of this invention is to provide a method to accomplish a looped back condition of communication circuits for testing the transmission lines and associated equipment. The transmitting of information to cause the looped condition must be transmitted through the system since an external means may not always be available.

I previously conceived a method shown in FIG. 1 of transmitting a code in the overhead or control bit portion of a data stream wherein this data stream can be multiplexed into a higher frequency signal and transmitted and when decoded at a remote station causes the actuation of relays to return or loop back the signal on an associated channel.

When attempting to use this approach with DS1C signals, a problem occurs in that the data signal is split into two 1.544 megabit per second DS1 data streams and the overhead bits are stripped off when the division occurs. Also, it is important that the detection equipment be able to differentiate between a loopback signal for a single DS1 signal format channel and for the two DS1 signal format channels comprising a DS1C signal format channel. One embodiment of the inventive concept uses an OR gate which requires that both input channels be a logic 0 before it will cause the loopback condition in the DS1C signal format modem. If only a single channel DS1 signal has a violation or loopback switching code, the activation of loopback circuitry does not occur until the signal reaches a modem which has DS1 format output signals. At this time, the single channel is decoded and this is looped back to the source or originator. The overhead information for each of the DS1 format data channels contains a stuff code which normally has three logic 0 bits if no stuffing is to occur and three logic 1 bits if stuffing is to occur. The detection circuitry uses a two out of three voting circuit to ascertain whether or not stuffing should occur. In view of the voting circuit, one of the bits of the three bits could be periodically violated and still not interfere with the stuff code decoding circuitry. In other words, when stuffing was to not occur, the stuff code could be 001 and when stuffing is to occur, the code could be 110 if a loopback condition were desired in either case. It would be necessary, of course, to have an integrator so that the loopback condition would not occur for sporadic violations and would continue only as long as the violations were continuously received.

In observing FIG. 5 it will be noted that the stuff bit control bits are labeled C for each of the channels represented. Each of channels M1 through M4 are DS1 format type channels and the total set of subframes comprises a DS2 6.312 megabit per second data channel. The three bits representing the stuff code for channel M1 are C11, C12 and C13. The physical position of the stuff bit for each of these channels is shown by the label on the right side of FIG. 5.

For the purposes of this invention, detection circuitry can be designed to normally look at only the third position stuff bits such as C13, C23, C33 or C43, depending upon the type of modem in which the detection circuit is inserted. If the detection circuit is inserted in a DS1C modem, the detection circuit would be looking at the third stuff code bit for each of subframes M1 and M2. When the stuff code violation had occurred a sufficient number of times, the switch in modem 48 of FIG. 2 would be actuated and a signal loopback would occur of the DS1C signal to the modem 38 in response to a switch being set in modem 38 to cause the loopback condition to occur.

Referring to FIG. 3, it will be noted that if the actuating signal is introduced into two DS1 format channels in modem 64 since a DS1C signal is being transmitted, it would be detected by two separate DS1 decoding circuits in block 74 since there is no intermediate DS1C modem.

As will be noted in FIG. 4, the switches can be individually thrown for two DS1 format signal channels in modem 94 and be received by a DS1C signal format detector in modem 100 to return the two DS1 format signals comprising the DS1C format data channel.

As will be realized, it is necessary to know what type of modem is involved if it is desired that the person doing the testing know where the loopback condition occurs. The looping back will occur at the first modem in the transmission link where the signal is demultiplexed to the signal format (DS1 or DS1C) set at the source multiplexer.

As may be obvious to one skilled in the art, a loopback request circuit is shown in FIG. 6 and this would be situated in one of the lefthand signal source or local TDM blocks of FIGS. 1–4. If only a DS1 format signal is to be looped back, only a single switch of the two switches is actuated. The request of FIG. 6 is detected for encoding purposes by the circuitry of FIG. 7. The four signal channels are passed to the switch 144 where the specific signal is passed in accordance with channel selection of all frame selection signals which are input by the unnumbered leads to lock 144. The selected channel signal is then output on lead 146 to the exclusive OR gate 148 which performs a violation of the stuff code bit being received on lead 150 by the exclusive OR gate 148. In the embodiment shown, this changes the third bit for each occurrence of CX3 (where X is subframe 1 to 4) to the value opposite that normally provided. This stuff code bit is then passed through block 152 to the circuitry which incorporates the overhead bits into a data stream of the type illustrated in FIG. 5. At the receiving or remote modem such as shown in the righthand side of each of FIGS. 1–4, there is a decode circuit such as shown in FIG. 8 which detects the occurrence of the third stuff bit.

If the remote modem has DS1C output signals, a circuit similar to that of FIG. 9 may be used which has an OR gate 180 with two inputs representing channels 1 and 2. If either one of these inputs is a logic 1, the circuit is inoperative. However, if both of the inputs are a logic 0 for a predetermined amount of time, the integrator 182 will charge to a value to actuate relay 188 and cause a loopback of the signals to occur such as illustrated in FIGS. 2 and 4. If the remote modem has outputs in the DS1 format, the OR gate 180 would only have a single input or the two inputs would be tied together to a single channel. Again, as long as the input were a logic 0 the integrator would remain charged and a relay would be actuated and held in an actuated condition. If the source modem is a DS1C signal such as shown in FIG. 3, two separate detectors such as FIG. 9 would be involved each of which would be switching a single DS1 channel to a looped back condition and testing could still occur.

Thus, the present invention allows the loopback coding information to be sent through a system where the loopback must occur through dissimilar channels of data and, in fact, is allowed to occur even though the original data channel has all of its control or overhead bits stripped from the channel.

My invention therefore lies in a concept of connecting local and remote time division multiplexing units where the overhead frame format of the signal transmission means differs from the frame format of at least one of the signal input and signal output means involved in the time division multiplex units.

Although I have described a single embodiment of the inventive concept I wish to be limited not by the specifics shown but only by the scope of the appended claims wherein I claim:

1. A data stream communication system comprising, in combination:
    local and remote TDM (time division multiplex) units having an interconnecting data stream with a given data frame format which includes a code comprising a plurality of stuff bits for adjusting the apparent frequency of operation at least one of said local and remote TDM units including means to change from a first high frequency signal to a low frequency signal and then back to a second high frequency signal where the frequency of said first and second high frequency signals are different;
    input first and output second means for supplying data to said local TDM unit and from said remote TDM unit respectively, where the data frame format of said first high frequency signal differs from said second high frequency signal;
    third means for intentionally violating the logic value of one of the bits in said code for said second high frequency signal comprising a frame of data at said local TDM unit as supplied to said interconnecting data stream;
    detecting the occurrence of violation in the stuff bit code in said second frequency signal at a remote location time division demultiplex portion of the data communication system; and
    interconnecting input and output terminals allocated to a frame of data at said remote location, where the frame of data comprises the data channels at said first frequency, after a predetermined consecutive number of violation detections occur.

2. A data communication system having a first high frequency signal connection means with a local TDM (time division multiplex) means, and a second high frequency signal connection means with a remote TDM and a third high frequency signal transmission means interconnecting said local and remote TDM means where the overhead data frame format of the signal transmission means differs from the data frame format of said first signal input and second signal output means and is higher in frequency than either said first or second signals, at least one of said local and remote TDM means including means for generating a set of conversion signals stripped of overhead data frame format information and lower in frequency said first, second and third signals comprising, in combination:

first means, as a part of the local TDM means, for intentionally altering the logic value of one of the bits in a three bit normally identical logic value stuff code for each "low frequency" representative data channel comprising a frame of data to be "looped" back;

second means, as part of a remote TDM means located at a remote location, for detecting the occurrence of nonuniformity in the three bit stuff code in the high frequency signal received at said remote location; and third means, connected to said second means and reacting to the detection of nonuniformity by said second means, for interconnecting second signal connection means at said remote location, where said interconnected second signals comprise a loopback of the data channels in said third signal having nonuniform stuff codes, after a predetermined consecutive number of nonuniformity detections occur.

3. The method of inserting switching data control bits in a communication data stream for causing remote destination site switched loopback of given frequency data signals transmitted on a higher frequency data communication line from a local source site where the protocol of the higher frequency data communication line is such that the given frequency data signals cannot be transmitted with their own overhead data bit signals but rather must be divided into lower frequency signal channels and recombined at the destination site to generate said given frequency data signals comprising the steps of:

violating the stuff bit overhead signals assigned at said source site to each of the lower frequency signal channels comprising said given frequency data signals;

detecting the violation of said stuff bit overhead signals at said destination site for each of said channels containing components of said given frequency data signal; and setting switches at said destination site in response to said detection of stuff bit violations whereby the given frequency data signal is looped-back to said source site.

4. Apparatus for inserting switching data control bits in a communication data stream for causing remote destination site switched loopback of given frequency data signals transmitted on a higher frequency data communication line from a local source site where the protocol of the higher frequency data communication line is such that the given frequency data signals cannot be transmitted with their own overhead data bit signals but rather must be divided into lower frequency signal channels and recombined at the destination site to generate said given frequency data signals comprising, in combination:

first means, comprising a part of a transmitter means, for violating the stuff bit overhead signals assigned at said source site to each of the lower frequency signal channels comprising said given frequency data signals;

second means, comprising a part of receiver means, for detecting violations of said stuff bit overhead signals at said destination site for each of said channels containing components of said given frequency data signal; and third means, connected to said second means at said destination site, for switching connections at said destination site in response to the detection of stuff bit violations whereby the given frequency data signal is looped-back to said source site.

* * * * *